United States Patent
Myers et al.

(10) Patent No.: US 10,452,072 B2
(45) Date of Patent: Oct. 22, 2019

(54) METHODS AND APPARATUSES FOR VEHICLE WADING SAFETY

(71) Applicant: Ford Global Technologies, LLC, Dearborn, MI (US)

(72) Inventors: Scott Vincent Myers, Camarillo, CA (US); Harpreetsingh Banvait, Sunnyvale, CA (US); Joshua Scott Smith, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 141 days.

(21) Appl. No.: 15/605,821

(22) Filed: May 25, 2017

(65) Prior Publication Data

US 2018/0341265 A1    Nov. 29, 2018

(51) Int. Cl.
| | | |
|---|---|---|
| *G01C 22/00* | (2006.01) | |
| *G05D 1/00* | (2006.01) | |
| *G05D 1/02* | (2006.01) | |
| *G01C 13/00* | (2006.01) | |
| *G01C 21/34* | (2006.01) | |

(52) U.S. Cl.
CPC ......... *G05D 1/0214* (2013.01); *G01C 13/008* (2013.01); *G01C 21/3407* (2013.01); *G05D 1/0088* (2013.01)

(58) Field of Classification Search
None
See application file for complete search history.

(56) References Cited

U.S. PATENT DOCUMENTS

| | | | | |
|---|---|---|---|---|
| 5,521,594 | A * | 5/1996 | Fukushima | B60G 17/0165 180/167 |
| 6,650,244 | B1 * | 11/2003 | Chen | G08B 21/20 340/425.5 |
| 6,798,343 | B2 * | 9/2004 | Carrier | A62C 27/00 340/539.13 |

(Continued)

FOREIGN PATENT DOCUMENTS

| | | |
|---|---|---|
| CN | 102923071 | 2/2013 |
| CN | 203580771 U | 5/2014 |

(Continued)

OTHER PUBLICATIONS

Halloway, W., Technology Guide: Wade Sensing, https://www.landrover.co.uk/explore-land-rover/one-life/index.html, Jul. 6, 2015.

*Primary Examiner* — Bhavesh V Amin
(74) *Attorney, Agent, or Firm* — David R. Stevens; Stevens Law Group (57) ABSTRACT

Techniques and examples pertaining to vehicle water wading safety are described. A processor implementable to a vehicle approaching a waterbody may receive data related to the waterbody from one or more above-water or under-water sensors. The processor may determine a top surface and a bottom profile of the waterbody, and calculate one or more critical trajectories of water-sensitive components of the vehicle if the vehicle is to wade through the waterbody by traversing the bottom profile. The processor may then determine the wading safety based on the critical trajectories and the top surface of the waterbody. The processor may further determine a wading route, and autonomously drive the vehicle to wade the waterbody via the optimal wading route.

17 Claims, 6 Drawing Sheets

(56) References Cited

U.S. PATENT DOCUMENTS

| | | | | |
|---|---|---|---|---|
| 7,143,363 B1* | 11/2006 | Gaynor | B63J 99/00 | 715/771 |
| 8,221,174 B2* | 7/2012 | March | B60F 3/0007 | 440/12.5 |
| 8,495,913 B2* | 7/2013 | Partington | G01F 23/2962 | 73/290 V |
| 9,227,479 B2* | 1/2016 | Clarke | B60G 17/0165 | |
| 9,302,586 B2* | 4/2016 | Tran | B60G 17/0165 | |
| 9,519,670 B2* | 12/2016 | Stanek | G06F 17/30336 | |
| 9,545,927 B2* | 1/2017 | Fairgrieve | B60W 50/082 | |
| 9,714,038 B1* | 7/2017 | He | H04L 67/12 | |
| 10,018,475 B2* | 7/2018 | Hakeem | G01C 21/3694 | |
| 2003/0158635 A1* | 8/2003 | Pillar | A62C 27/00 | 701/1 |
| 2003/0158638 A1* | 8/2003 | Yakes | A62C 27/00 | 701/22 |
| 2003/0158640 A1* | 8/2003 | Pillar | A62C 27/00 | 701/29.4 |
| 2004/0002794 A1* | 1/2004 | Pillar | A62C 27/00 | 701/1 |
| 2005/0170710 A1* | 8/2005 | Darby | B60F 3/00 | 440/12.51 |
| 2005/0216182 A1* | 9/2005 | Hussain | G01C 21/20 | 701/532 |
| 2009/0159020 A1* | 6/2009 | Hall | B60K 11/02 | 123/41.11 |
| 2009/0187314 A1* | 7/2009 | Kitamura | B60R 16/0231 | 701/45 |
| 2010/0085198 A1* | 4/2010 | Boss | G01F 23/0007 | 340/618 |
| 2010/0257931 A1* | 10/2010 | Partington | G01F 23/2961 | 73/290 V |
| 2011/0111651 A1* | 5/2011 | Lee | B60F 3/0061 | 440/12.63 |
| 2011/0202265 A1* | 8/2011 | Norden | F01N 11/002 | 701/113 |
| 2013/0307679 A1* | 11/2013 | Tran | B60G 17/0165 | 340/442 |
| 2014/0085066 A1* | 3/2014 | Tran | B60G 17/0165 | 340/425.5 |
| 2014/0293746 A1* | 10/2014 | Tran | G01F 23/00 | 367/93 |
| 2015/0046071 A1* | 2/2015 | Clarke | B60W 30/18018 | 701/112 |
| 2016/0196656 A1* | 7/2016 | Cund | B60W 40/06 | 348/148 |
| 2018/0341265 A1* | 11/2018 | Myers | G05D 1/0214 | |

FOREIGN PATENT DOCUMENTS

| | | |
|---|---|---|
| CN | 107991669 | 5/2018 |
| DE | 102012015764 A1 | 2/2014 |
| EP | 2698299 A1 | 2/2014 |
| GB | 2499419 | 8/2013 |
| GB | 2517788 | 3/2015 |

* cited by examiner

METHODS AND APPARATUSES FOR VEHICLE WADING SAFETY

TECHNICAL FIELD

The present disclosure generally relates to automotive vehicles and, more particularly, to methods and apparatuses for an automotive vehicle to safely wade through a waterbody.

BACKGROUND

Flash floods, or rapid flooding, is a common phenomenon in geomorphic low-lying areas, or areas where microclimate may change rapidly and become unpredictable. For instance, heavy rainfall due to a thunderstorm or meltwater from ice or snow may cause waterbodies, either stationary or flowing, to form or otherwise appear in an area. The waterbodies may happen to cut cross or interfere with a traffic roadway (hereinafter "a road"), and automotive vehicles (e.g., cars, trucks, buses and the like) using the road may thus be impeded. With at least a section of the road being flooded by a waterbody, it would be difficult for a driver of an automotive vehicle to judge the flooding situation and decide whether it is safe or not to "wade" the waterbody, that is, to drive the vehicle through the waterbody from one side of the waterbody to the other side of the waterbody.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1:
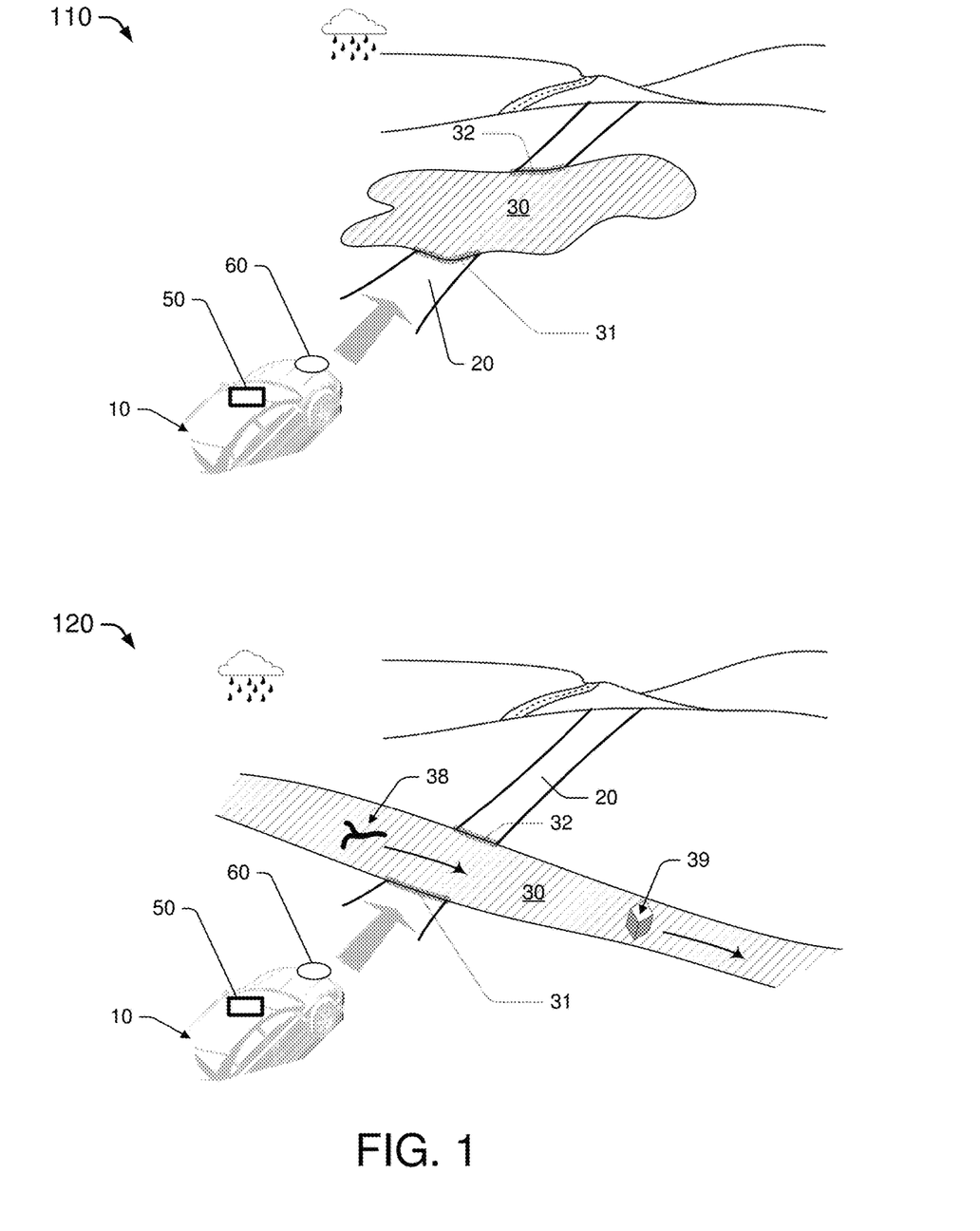
FIG. 1 is a diagram depicting example scenarios in which embodiments in accordance with the present disclosure may be utilized.

As mentioned above, due to unpredictable microclimate, a road may be flooded or otherwise interfered by a temporary, standing or flowing waterbody. With at least a portion of the road surface being covered by the waterbody, a driver of an automotive vehicle approaching the waterbody may not be able to easily observe the situation of the road surface and decide whether it is safe or not to drive the vehicle through the waterbody. FIG. 1 illustrates example scenarios 110 and 120 in which embodiments in accordance with the present disclosure may be utilized. For each of example scenarios 110 and 120, vehicle 10 is driving on road 20 which is interfered by waterbody 30. In scenario 110, waterbody 30 may be a puddle of water and appear to be stationary. On the other hand, waterbody 30 of scenario 120 may be a stream of flowing water carrying floating objects such as a tree branch 38 and a wooden box 39.

To avoid or otherwise ameliorate the aforementioned difficulty in deciding whether it is safe for vehicle 10 to wade through waterbody 30 from one side to the other side, the present disclosure proposes techniques, schemes, processes and apparatus pertaining to making the decision by sensing, observing or otherwise characterizing one or more aspects of waterbody 30 using one or more sensors disposed on vehicle 10. For example, an apparatus may be installed in or otherwise implemented to vehicle 10 to sense, observe or characterize the water depth of waterbody 30, or at least a portion of waterbody 30 that intersects or overlaps with road 20. Under a proposed scheme, as shown in scenarios 110 and 120, vehicle 10 may be provided with one or more sensors disposed thereon, such as above-water sensor 50 which is capable of operating above the water surface (i.e., the top surface of waterbody 30), as well as under-water sensor 60 which is capable of operating under the water surface. As will be described below in further details, certain sensors can operate both above and under water, and thus can serve vehicle 10 as both an above-water sensor and an under-water sensor.

For an automotive vehicle, such as vehicle 10, there exist certain critical components that are susceptible to water damage (hereinafter interchangeably referred as "water-sensitive components"). Therefore, to ensure normal operation of the automotive vehicle, it is essential to prevent these critical components from coming into contact with and/or submerged in water. As an example, the critical components may include components of the drive-train of the vehicle. For instance, the air intake of an automotive vehicle is considered a critical component. Suppose that, while vehicle 10 wades through waterbody 30, an air intake of vehicle 10 goes below the water surface of waterbody 30 for a period of time, the engine of vehicle 10 may starve of air and stall. In addition, as water is not compressible, water reaching engine of vehicle 10 through the air intake would cause catastrophic damages to the engine. As another example, spark plugs and unshielded electronics of vehicle 10 should also avoid contacting with water while wading through waterbody 30, as they are susceptible to water damage. Finally, although at a lesser degree of concern, water intrusion into trunk or the passenger compartment of vehicle 10 during the wading may cause damages to the interior of the vehicle.

In order to determine whether one or more of the critical components may be subject to water damage when vehicle 10 wades through waterbody 30, it is required that one or more aspects of waterbody 30 be sensed, observed, determined or characterized using various above-water sensors and/or under-water sensors disposed on vehicle 10, such as above-water sensor 50 and under-water sensor 60. The one or more aspects of waterbody 30 may include one or more depths of water at one or more locations across waterbody 30. The one or more aspects of waterbody 30 may also include a bottom profile of the waterbody, namely, the shape or topography of the surface of road 20 that is covered by waterbody 30. The present disclosure proposes at least three schemes, which will be described in detail below, to determine or estimate the one or more aspects of waterbody 30 including one or more depths of water at various locations across waterbody 30 as well as the bottom profile of waterbody 30. After the depth(s) of water and the bottom profile of waterbody 30 are determined, a corresponding critical trajectory will be calculated for each of the critical components of vehicle 10. The critical trajectory represents a moving trajectory of the corresponding critical component as vehicle 10 traverses the bottom profile to wade through waterbody 30. Based on the critical trajectories and the one or more aspects of waterbody 30, it may be determined whether it is safe for vehicle 10 to wade through waterbody 30.

Under a first proposed scheme, the depth(s) and the bottom profile of waterbody 30 may be determined using data from one or more above-water sensors (such as above-water sensor 50 of FIG. 1) along with topographic information of a location related to waterbody 30. In some embodiments, the topographic information may be data representative of a high-definition (HD) three-dimensional (3D) map of the area where the waterbody is located. The HD 3D map is characterized when road 20 is free from temporary waterbodies caused by the microclimate, and often digitized and stored in a memory on the vehicle or remotely accessed by the vehicle through one or more wireless mobile communication links such as satellite and/or wireless communications stations/towers. The one or more above-water sensors can detect one or more edges (such as near edge 31 and far edge 32 as shown in FIG. 1) of waterbody 30 that are part of the boundary/boundaries of waterbody 30. As a result of the detection, the one or more above-water sensors can generate data representing edges 31 and 32, which may be compared to the HD 3D map (e.g., by finding corresponding locations of edges 31 and 32 on the HD 3D map), and thus the bottom profile of waterbody 30, or equivalently, the shape or topography of road 20 under waterbody 30, may be found or otherwise identified on the HD 3D map.

Figure 2:
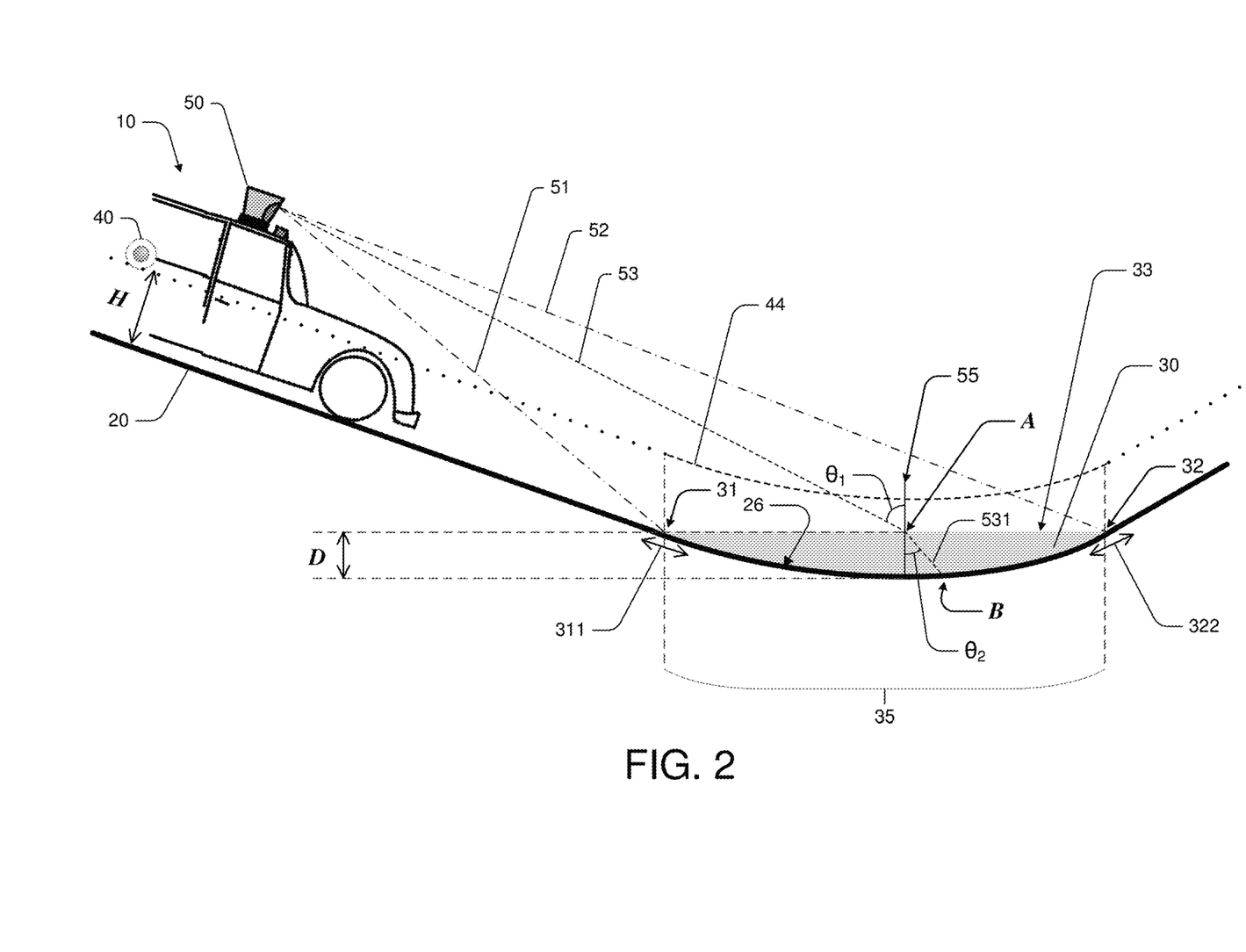
FIG. 2 is a diagram depicting an example method to determine one or more aspects of a waterbody in accordance with an embodiment of the present disclosure.

The first proposed scheme is further illustrated in FIG. 2. In FIG. 2, vehicle 10 is equipped with one or more above-water sensors 50. For simplicity, description below is provided in the context of a single above-water sensor 50 although multiple above-water sensors 50 may also be utilized. In order to gain a better perception of waterbody 30 toward which vehicle 10 is approaching, above-water sensor 50 may be preferably disposed at a high location of vehicle 10, facing a forward direction of vehicle 10. This disposition of above-water sensor 50 is especially the case if a line-of-sight (LOS) needs to be established between above-water sensor 50 and waterbody 30 such that above-water sensor 50 may be used to sense, observe, determine or characterize waterbody 30 more effectively. There may be various choices for above-water sensor 50. For example, above-water sensor 50 may be a visible-light camera, an infrared camera, a stereo camera, a time-of-flight (TOF) camera, a light-detection-and-ranging (LIDAR) transceiver, or an ultrasound camera, each of which would require the establishment of the LOS, such as LOS 51, 52 and 53 shown in FIG. 2. In cases where a LOS is not required to be established between above-water sensor 50 and waterbody 30, e.g., above-water sensor 50 being a radio-detection-and-ranging (RADAR) transceiver, above-water sensor 50 may be conveniently disposed at other locations of vehicle 10.

Under the first proposed scheme, above-water sensor 50 can detect one or more edges of waterbody 30, such as near edge 31 and far edge 32 as shown in FIGS. 1 and 2. For example, above-water sensor 50 may be a stereo camera, and can generate data representing near edge 31 and far edge 32 as one or more pictures of waterbody 30 taken with different depths of focus using stereo camera 50. The pictures may be used to estimate a spatial relation relative to vehicle 10, including a distance, for each of edges 31 and 32. Vehicle 10 may be equipped with a global positioning system (GPS), and a corresponding location of vehicle 10 on the HD 3D map may thus be determined or otherwise located using the GPS. With the relative spatial relation for each of edges 31 and 32 estimated, it follows that a corresponding location of each of near edge 31 and far edge 32 may also be located on the HD 3D map. Based on the corresponding locations of edges 31 and 32 located on the HD 3D map, the topography of road 20 between edges 31 and 32, which is currently covered under waterbody 30 and thus invisible to a driver of vehicle 10, may be determined using the HD 3D map. In this way, bottom profile 35 of waterbody 30 may be found or otherwise identified on the HD 3D map. In addition, depths of water at various locations of waterbody 30, such as maximum water depth D shown in FIG. 2, may also be determined in the same manner. Given that every waterbody has substantially a flat top surface, the depths of water at various locations of waterbody 30 may be collectively used to define top surface 33 of waterbody 30.

It is worth noting that waterbody 30 as depicted in scenario 110 of FIG. 1, though relatively stationary with respect to road 20, may still be unstable at its top surface. For example, top surface 33 of waterbody 30 of FIG. 2 may have waves or ripples due to local high wind. As a result of the waves and ripples, edges 31 and 32 may move back and forth, showing variations 311 and 322, respectively, as shown in FIG. 2. In addition, depths of waterbody 30 at various locations, including maximum depth D, may also have variations over time. In this case, statistical filters may be employed to analyze the data representing edges 31 and 32 (e.g., several pictures of waterbody 30 taken by stereo camera 50 over a period of time) and determine a best estimation for the depth(s) of waterbody 30, including maximum depth D, as well as edges 31 and 32, despite variations 311 and 322.

Under a second proposed scheme, the depth(s) and the bottom profile of waterbody 30 may be indirectly measured using one or more above-water sensors, such as above-water sensor 50 of FIGS. 1 and 2. The one or more above-water sensors may include a TOF camera, a LIDAR transceiver (or "LIDAR" in short), a RADAR transceiver (or "RADAR" in short), an ultrasound transceiver, or a combination thereof. The second proposed is also illustrated using FIG. 2. In an example embodiment, above-water sensor 50 may include a LIDAR, which is capable of transmitting a beam of light as a sensing signal toward waterbody 30 along a LOS (such as LOS 53 of FIG. 2). As the LIDAR-emitted light proceeds in the air and arrives at top surface 33 of waterbody 30 at point A of FIG. 2, part of the light (called "first reflected signal") may be reflected back to LIDAR 50 along LOS 53, while part of the light may be refracted per Snell's law into waterbody 30 along refraction path 531. As shown in FIG. 2, incident angle $\theta_1$ may be defined between LOS 53 and a normal line 55 perpendicular to top surface 33, while refracted angle $\theta_2$ may be defined between refraction path 531 and normal line 55. Angles $\theta_1$ and $\theta_2$ follow Snell's law and fulfill a mathematical relation that $n_1 \cdot \sin(\theta_1) = n_2 \cdot \sin(\theta_2)$, wherein $n_1$ is the refractive index of the air (typical value being 1) and $n_2$ is the refractive index of the waterbody (typical value being 1.33 at 25° C.). As the refracted light proceeds in waterbody 30 and arrives at point B of road surface or ground surface 26 of road 20, currently hidden under waterbody 30, part of the refracted light (called "second reflected signal") may be reflected by ground surface 26 at point B and travel along refraction path 531 to point A before being refracted again at point A and returning to LIDAR 50 along LOS 53. The first and second reflected signals may then be used to determine the distance between point A and point B. The distance between point A and point B may be determined based on a difference in time between a time when LIDAR 50 receives the first reflected signal and a time when LIDAR 50 receives the second reflected signal. In particular, the distance between point A and point B may be determined as the difference in time multiplied by the speed of light in waterbody 30, while the speed of light in waterbody 30 is the speed of light in the air divided by the refractive index of waterbody 30. LIDAR 50 may be used to scan across top surface 33 of waterbody 30 in this manner. That is, for each of multiple locations across top surface 33, LIDAR 50 may transmit the sensing light at the given location and subsequently receives the respective first and second refracted signals, and thus the A–B distance (i.e., the distance between A and B) for that location can be determined as described above. In this way, the bottom profile 35 and one or more water depths of waterbody 30 (including maximum water depth D) may thus be inferred, calculated, estimated, determined, reconstructed or otherwise indirectly measured using the A–B distance determined for each of multiple locations as well as $\theta_1$ and $\theta_2$ for each of the multiple locations.

Similar to the first proposed scheme, in the event that top surface 33 of waterbody 30 is unstable due to waves or ripples, the second proposed scheme may also employ statistical filters to analyze the first and second reflected signals before calculating the water depth(s) (such as maximum depth D) and bottom profile 35 of waterbody 30. However, unlike the case of the first proposed scheme, infrared cameras and visible-light cameras including stereo cameras may not suffice the second proposed scheme, as the reflectivity of water at top surface 33 of waterbody 30 may make stereo imaging for 3D mapping difficult with infrared or visible-light cameras. In contrast, infrared cameras and visible-light cameras may be the primary sensors used for the first proposed scheme.

As described above, for vehicle 10 to safely wade through waterbody 30, it is essential that the water-sensitive components (i.e., the critical components) of vehicle 10, such as critical component 40 of FIG. 2, not contact waterbody 30 when vehicle 10 travels on bottom profile 35 of waterbody 30 from near edge 31 to far edge 32. As also described above, a critical trajectory, such as critical trajectory 44 of FIG. 2, may be calculated, with the critical trajectory representing a projected moving path of a corresponding critical component of vehicle 10 as vehicle 10 wades through waterbody 30. As shown in FIG. 2, critical trajectory 44 represents the moving path of critical component 40 as vehicle 10 wades through waterbody 30 by traveling on bottom profile 35 of waterbody 30.

It is worth noting that, in FIG. 2 as bottom profile 35 of waterbody 30 is rather smooth, critical trajectory 44 pretty much follows bottom profile 35 (or equivalently, ground surface 26 underneath waterbody 30) at a constant distance H, which is essentially the distance between critical component 40 and roadway 20. Theoretically, as long as distance H is larger than maximum water depth D, it may be determined that it is safe for vehicle 10 to wade through waterbody 30 without damaging critical component 40. In reality, due to possible waves, ripples or water splashes at top surface 33 of waterbody 30, it may be determined that it is safe for vehicle 10 to traverse waterbody 30 if distance H is larger than maximum water depth D by a safety margin that accounts for the possible waves, ripples or water splashes. As mentioned above, vehicle 10 may have multiple critical components and thus multiple critical trajectories, and it may be determined safe for vehicle 10 to wade through waterbody 30 when it is determined that each of the critical trajectories is above top surface 33 of waterbody 30. On the other hand, when it is determined that a portion of any critical trajectories may likely be below top surface 33 of waterbody 30, it may be determined unsafe for vehicle 10 to wade through waterbody 30.

Figure 3:
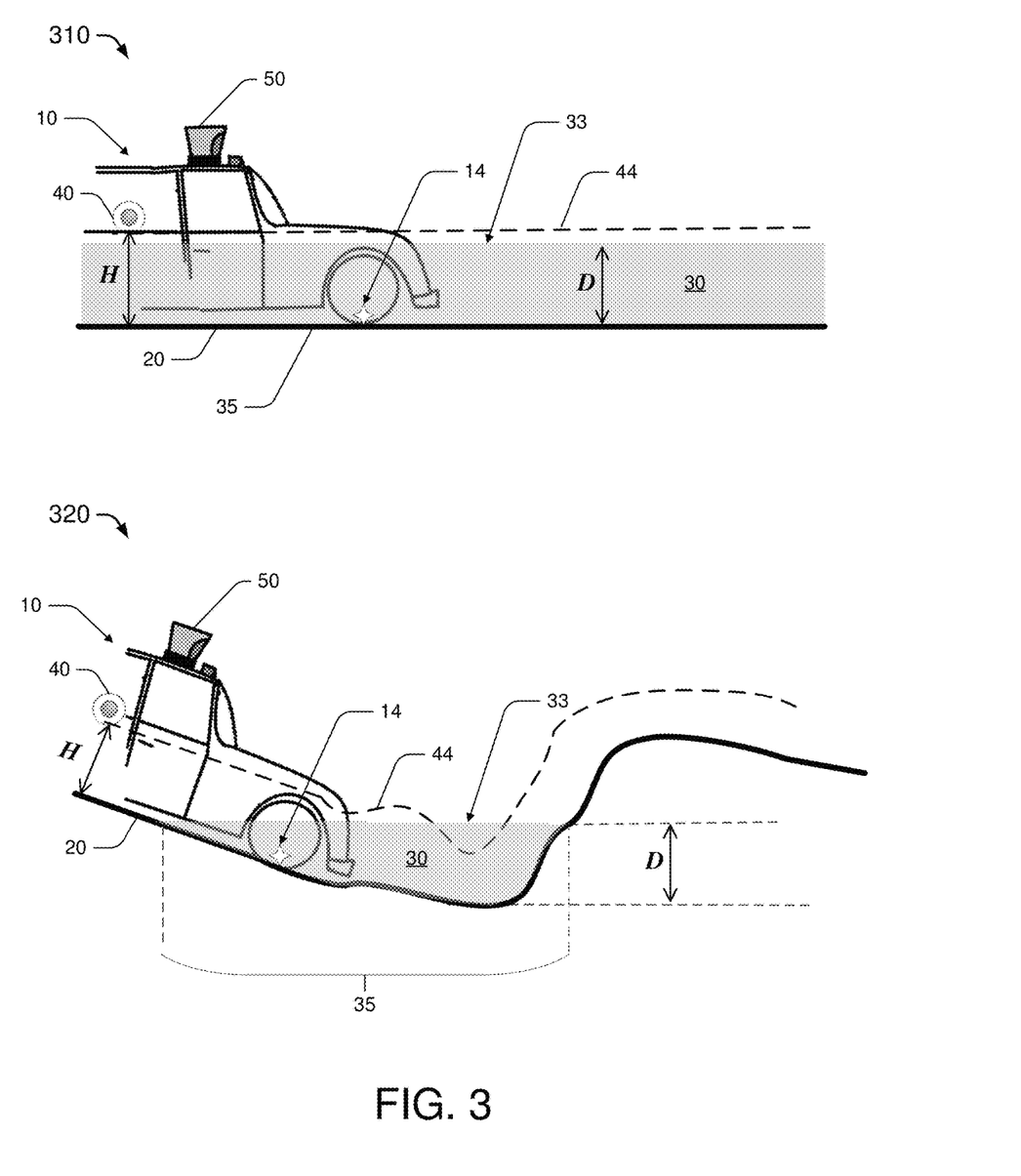
FIG. 3 is a diagram depicting an example critical trajectory of a water-sensitive component of a vehicle as the vehicle wades a waterbody in accordance with an embodiment of the present disclosure.

However, when a waterbody has a bottom profile that is not relatively flat or smooth, a critical trajectory may not simply follow the bottom profile by a constant height or distance. To illustrate this point, two contrasting scenarios are depicted in FIG. 3. In scenario 310 of FIG. 3, vehicle 10 is wading through waterbody 30, which floods road 20, by traversing on bottom profile 35 of waterbody 30. Bottom profile 35 is rather flat, as road 20 is rather flat in the flooded area. It follows that critical trajectory 44 corresponding to critical component 40 of vehicle 10 is also a relatively straight line, which is spaced from bottom profile 35 by a substantially constant distance H equivalent to the height of a location of critical component 40 relative to road 20. Since critical trajectory 44 of vehicle 10 stays above top surface 33 of waterbody 30 as vehicle 10 traverses bottom profile 35, it may be determined that it is safe for vehicle 10 to wade through waterbody 30.

In contrast, in scenario 320 of FIG. 3, vehicle 10 is wading through waterbody 30 which floods a section of road 30 that is rugged and uneven. Even though the maximum water depth of waterbody 30 is essentially the same as that of scenario 310 (both of depth D as shown in scenarios 310 and 320, respectively), bottom profile 35 of waterbody 30 of scenario 320 has a rather rough and bumpy topography. Because vehicle 10 has a certain length and height by and of itself, as vehicle 10 traverses bottom profile 35 and wades through waterbody 30, critical trajectory 44 corresponding to critical component 40 of vehicle 10 in scenario 320 may not simply follow bottom profile 35 by a constant distance H. For scenario 320, a mathematical model of vehicle 10, called "spatial model", is required for a computation or calculation of critical trajectory 44. Specifically, the spatial model of vehicle 10 may define a spatial relationship of each of the critical components of vehicle 10, including critical component 40, relative to a fixed reference point of the vehicle, such as reference point 14 of FIG. 3 located at the bottom of a front wheel of vehicle 10. The reference point may be chosen to be any fixed location of vehicle 10. For example, in some embodiments, reference point 14 of vehicle 10 may be chosen to locate at the middle point of the front bumper of vehicle 10. Alternatively, the fixed location of above-water sensor 50 may serve equally well as the reference point 14. In some embodiments, the spatial model may also include spatial relationship of other non-critical components relative to the fixed reference point. The non-critical components may include wheels, bumpers and chassis and, unlike the critical components, the non-critical components may not be susceptible to water damage. The inclusion of the non-critical in the spatial model, however, may be essential in enhancing the accuracy in calculating the critical trajectories. The spatial model may be known by the design of vehicle 10, as the spatial location of each of the critical and non-critical components relative to reference point 14 has been predetermined by the design of vehicle 10. For example, some models of vehicles may have a snorkel air intake that is located as high as 3-5 feet above the ground, and the spatial model is used to capture such a feature. Combining the spatial model of vehicle 10 and a known topology of a ground surface of road 20 (or at least bottom profile 35 of waterbody 30 as determined previously), critical trajectories of vehicle 10, including critical trajectory 44 of scenario 320 of FIG. 3, may be calculated or otherwise predicted. With all the critical trajectories of vehicle 10 calculated and top surface 33 of waterbody 30 determined as described above, it may therefore be determined whether it is safe for vehicle 10 to wade waterbody 30 based on the critical trajectories and top surface 33 as described earlier. As shown in scenario 320 of FIG. 3, even though critical component 40 appears to be located above roadway 20 at a height H that is larger than the maximum water depth D of waterbody 30, a portion of critical trajectory 44, as calculated, would go below top surface 33 of waterbody 30 due to the rugged topography of roadway 20. Therefore, it may be determined unsafe for vehicle 10 to wade the waterbody 30.

Since all the water-sensitive components may not be similarly critical to the operation of the vehicle, in some embodiments, each of the critical trajectories may be given a different "weighting" in determining whether it is safe to wade the waterbody. For example, it may be absolutely critical to keep an air intake of the vehicle above the water surface to prevent stalling of the engine. However, it may be less critical if some unshielded electronics such as anti-collision radar transceivers are below the water surface, as the vehicle may still be able to drive around even if the anti-collision function is lost.

The present disclosure further proposes a third scheme for determining one or more depths and the bottom profile of a waterbody. As shown in scenarios 410 and 420 of FIG. 4, vehicle 10 is equipped with one or more under-water sensors, such as under-water sensor 60, in addition to above-water sensor 50. For simplicity, description below is provided in the context of a single under-water sensor 60 although multiple under-water sensors 60 may also be utilized. While above-water sensor 50 may be utilized to sense, determine or otherwise characterize aspect(s) of waterbody 30 such as edges, one or more depths or top surface 33 of waterbody 30, as described above, under-water sensor 60 may be deployed into waterbody 30 to perform a direct measurement of one or more aspects of waterbody 30. The one or more above-water sensors may include a LIDAR, a RADAR, a sound-navigation-and-ranging (SONAR) transceiver (or "SONAR" in short), a bathymetric sensor, or a combination thereof. Under-water sensor 60 operates in a way similar to above-water sensor 50 as described in the second proposed scheme, except that under-water sensor 60 operates to sense or directly measure one or more depth(s) and the bottom profile of waterbody 30 when submerged or otherwise deployed into waterbody 30. Under-water sensor 60 may be preferably disposed on vehicle 10 at a location that is easy for under-water sensor 60 to submerge into waterbody 30 when deployed, such as at a lower side of the front bumper of vehicle 10.

Figure 4:
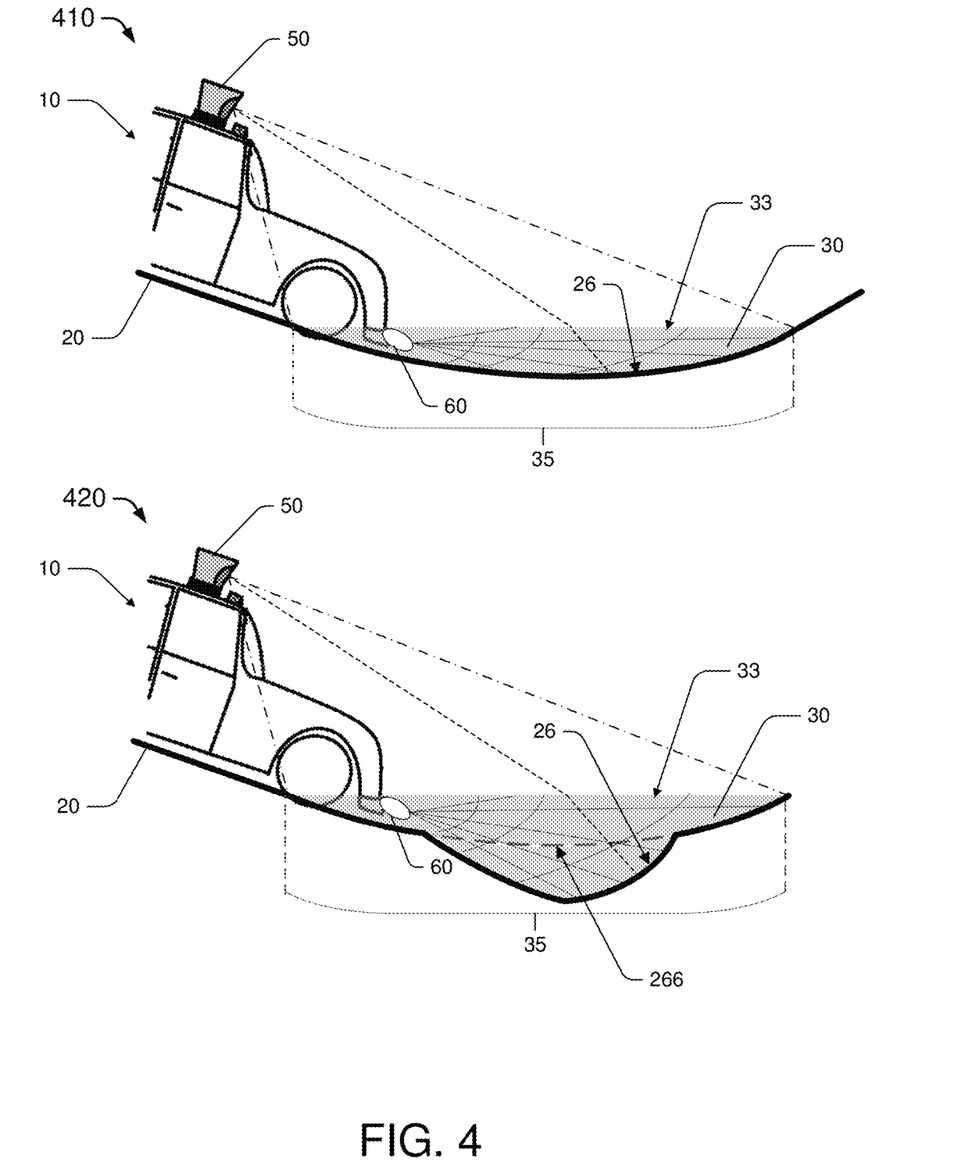
FIG. 4 is a diagram depicting another example method to determine one or more aspects of a waterbody in accordance with an embodiment of the present disclosure

In an example embodiment, under-water sensor 60 may include an active SONAR (hereinafter referred as "SONAR 60") that may be controlled to transmit a sound wave as a sensing signal when SONAR 60 is submerged within waterbody 30. The sensing sound signal may reach top surface 33 of waterbody 30 as well as ground surface 26 of road 20 underneath waterbody 30. A portion of the sensing sound signal may be reflected by top surface 33 and then received by SONAR 60 as a first reflected signal, whereas another portion of the sensing sound signal may be reflected by ground surface 26 and then received by SONAR 60 as a second reflected signal. The first reflected signal may then be used to determine the location of top surface 33 relative to SONAR 60, whereas the second reflected signal may be used to determine the location and topography of ground surface 26 relative to SONAR 60, which in turn can be used to determine bottom profile 35 of waterbody 30. Combining the location and topography of ground surface 26 and the location of top surface 33, water depths at various locations of waterbody 30 may be determined accordingly.

Compared with the second proposed scheme, the third proposed scheme may exhibit an advantage of providing a more accurate measurement of one or more aspects (e.g., top surface 33 and bottom profile 35) of waterbody 30, as the measurement is directly conducted from within the waterbody, instead of indirectly conducted outside the waterbody. Compared with the first proposed scheme, the third proposed scheme may exhibit an advantage of capturing in-situ topographical changes of ground surface 26 underneath waterbody 30, which may not be captured by the pre-characterized topographic information of the location related to waterbody 30, such as the HD 3D map used in the first proposed scheme. For example, as shown in scenario 420 of FIG. 4, ground surface 26 may have been eroded by a flash flood that creates waterbody 30, and thus carved deeper than its pre-characterized ground surface 266. The first proposed scheme would not capture the topographical change from ground surface 266 to ground surface 26, whereas the third proposed scheme will correctly identify ground surface 26 due to its direct measurement nature. It is advantageous that vehicle 10, simultaneously equipped with one or more above-water sensors 50 and one or more under-water sensors 60, may use one, some or all of the first, second and third proposed schemes disclosed above to determine depth(s) and bottom profile 35 of waterbody 30. For instance, in scenario 420, with above-water sensor 50 and using the first proposed scheme only, vehicle 10 may not be able to identify that bottom profile 35 has been changed from where it was before the flash flood (i.e., ground surface 266) to where it is now (i.e., ground surface 26). Vehicle 10 may therefore decide that it is safe to wade waterbody 30, and so it proceeds. However, after vehicle 10 starts the wading, the third proposed scheme may be invoked (as soon as under-water sensor 60 is deployed into waterbody 30 during the wading), and the actual ground surface 266 may be detected. At this time, vehicle 10 may determine that it is unsafe to continue the wading, and end up backing up and out of waterbody 30. Namely, by invoking both the first and third schemes in scenario 420, vehicle 10 may be able to avoid unsafe wading, which may not be avoided were the first scheme to be solely relied on.

In some cases in which the waterbody is flowing at a significant flowing speed, or having a strong current, the determination of whether it is safe for the vehicle to wade through the waterbody may become more complicated. That is, in addition to considering whether any of the critical trajectories of the vehicle would go under the top surface of the waterbody during the wading, it may also need to be considered whether the vehicle may be pushed and dislocated sideway by the strong current during the wading. A buoyancy model of the vehicle, which models the behavior of the vehicle when subject to a flowing water, is needed for determining the safety of the vehicle during the wading process. Similar to the spatial model, the buoyancy model may be pre-determined by the design of the vehicle. In some embodiments, the vehicle may be equipped with various sensors to update or otherwise adjust the buoyancy model in-situ. For example, the vehicle may exhibit slightly different buoyancy behavior due to different weight carried by the vehicle. A weight sensor disposed in the vehicle may be used to measure the actual carried weight of the vehicle and adjust the buoyancy model accordingly.

In addition to the buoyancy model, it is required to measure or at least estimate the speed of the flowing current of the waterbody so that the wading safety may be determined using the buoyancy model. One approach is to employ a flow meter as under-water sensor 60 that is deployed into waterbody 30 according to the third proposed scheme as disclosed above. Namely, under-water sensors 60 may be used to directly measure the speed of a current of waterbody 30 when submerged or otherwise deployed into waterbody 30. Various types of flow meters may be used as under-water sensors 60 to measure the flow speed, such as mechanical flow meters (e.g., a rotary piston meter or a turbine flow meter), optical flow meters (e.g., a laser-based flow meter) and/or pressure-based flow meters (e.g., a Venturi meter or a Dall tube). Another approach is by using above-water sensor 50 of the first or second proposed schemes, as disclosed above, to estimate the flowing speed of waterbody 30. For example, as shown in scenario 120 of FIG. 1, above-water sensor 50 may be used to track one or more floating objects in waterbody 30, such as tree branch 38 or wooden box 39, by taking a motion picture over a period of time as the floating objects are carried downstream by the current of waterbody 30. Subsequently, based on the motion picture, it may be estimated how far the floating objects have been carried during that period of time, and the speed of the current may be determined accordingly.

Figure 5:
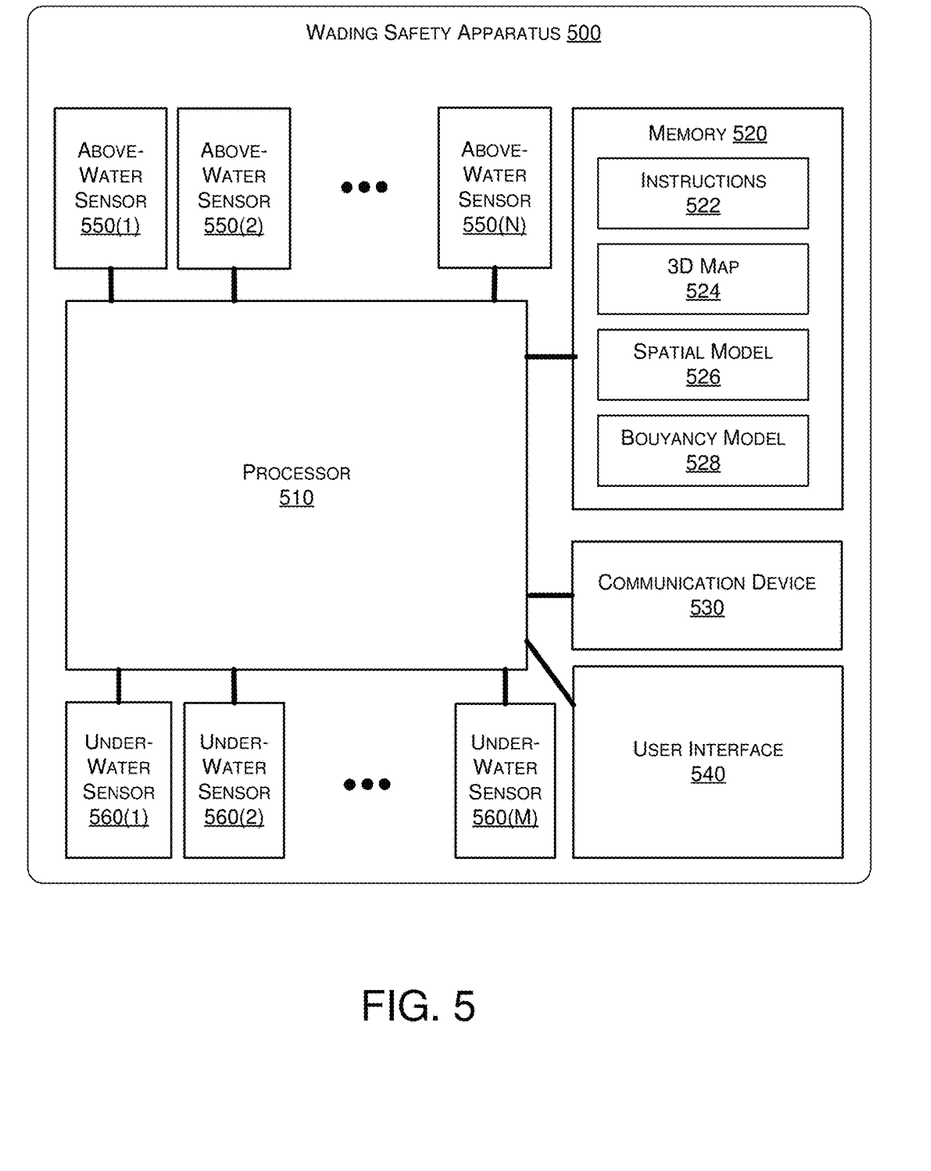
FIG. 5 is a block diagram depicting an example apparatus in accordance with an embodiment of the present disclosure.

FIG. 5 illustrates an example apparatus, or wading safety apparatus 500, in accordance with an embodiment of the present disclosure. Wading safety apparatus 500 may perform various functions related to techniques, methods and systems described herein, including those described above with respect to the first, second and third schemes of determining the water depth(s) and the bottom profile of waterbody 30, and the determining of whether it is safe for vehicle 10 to wade through waterbody 30, as well as those described below with respect to process 600 of FIG. 6. Wading safety apparatus 500 may include at least some of the components illustrated in FIG. 5.

Referring to FIG. 5, wading safety apparatus 500 may include processor 510 and memory 520. Memory 520 may store the HD 3D 524 map utilized by the first proposed scheme, the spatial model 526 used for calculating the critical trajectories, as well as buoyancy model 528 used in determining the wading safety, as described above. Memory 520 may also store one or more sets of instructions 522 for processor 510 to execute and perform the various determining, estimating and calculating functions as described above in the present disclosure, including those performed in the first, second and third schemes. For example, upon executing one or more sets of instructions 522, processor 510 may determine bottom profile 35 and various water depths of waterbody 30, calculate the critical trajectories 44 each corresponding to a critical component 40 of vehicle 10, and determine whether it is safe for vehicle 10 to wade waterbody 30 based on top surface 33 of waterbody 30 and critical trajectory 44 of vehicle 10.

In some embodiments, wading safety apparatus 500 may include one or more above-water sensors 550(1)-550(N). Each of above-water sensors 550(1)-550(N) may be an implementation of above-water sensors 50 of FIGS. 1-4 and used by processor 510 to perform the various determining, estimating and calculating functions as described above in the present disclosure, including those performed in the first, second and third schemes. In some embodiments, wading safety apparatus 500 may include one or more under-water sensors 560(1)-560(M). Each of under-water sensors 560(1)-560(M) may be an implementation of under-water sensors 60 of FIGS. 1, 2 and 4 and used by processor 510 to perform the various determining, estimating and calculating functions as described above in the present disclosure, including those performed in the first, second and third schemes.

In some embodiments, processor 510, upon executing one or more sets of instructions 522, may further determine a wading route in response to the determining that it is safe for vehicle 10 to wade through waterbody 30, such that vehicle 10 is able to wade through waterbody 30 safely via the wading route. For example, under-water sensors 560(1)-560(M) may detect that there is a rock of a significant size on the right side of road 20 submerged beneath top water surface 33. Processor 510 may thus determine the wading route to be going slightly to the left of road 20 so as to avoid the submerged rock. In some embodiments, processor 510, upon executing one or more sets of instructions 522, may further determine a wading speed after determining the wading route, such that vehicle 10 is able to wade through waterbody 30 safely via the wading route at the wading speed. Depending on specific topography of bottom profile 35 of waterbody 30, it may be safer to wade through waterbody 30 at a certain speed, or according to a certain speed profile. For example, if ground surface 26 as shown in FIG. 4 is very bumpy, it may be safer to drive at a low speed so that water may not be splashed high and damage some critical components or stall the engine.

In some embodiments, processor 510, upon executing one or more sets of instructions 522, may further determine an alternative route in response to the determining that it is unsafe for vehicle 10 to wade through waterbody 30, such that vehicle 10 is able to avoid waterbody 30 by driving the alternative route. The alternative route may be determined based on information such as historical flood data, historical weather information and present-time crowd-sourced information provided by other vehicles in the area. The alternative route may also be determined based on information of current microclimate, weather forecast, as well as estimated time to a possible flood zone. These various information or data may be received or otherwise accessed via a communication device 530, as disclosed below.

In some embodiments, wading safety apparatus 500 may include a communication device 530 capable of wirelessly transmitting and receiving data. For example, communication device 530 may be used by processor 510 to remotely access a data serve and update 3D map 524 stored in memory 520, especially when vehicle 10 drives to a new area where 3D map 524 is required to be updated for the new area. In some embodiments, communication device 530 may be used by processor 510 to receive microclimate information of the location of waterbody 30. The microclimate information may be used to facilitate the determination of the wading safety. For example, even if it is determined safe to wade through waterbody 30 based on calculated critical trajectory 44 and the flowing speed of waterbody 30, the microclimate information received by communication device 530 may show a heavy thunder storm and a gushing flash flood coming to merge with waterbody 30, and thus processor 510 may determine it is unsafe to wade through waterbody 30 nonetheless.

In some embodiment, vehicle 10 may be an autonomous vehicle, and processor 510 of wading safety apparatus 500 may also directly control vehicle 10 to wade through waterbody 30 via the wading route. In some embodiment, processor 510 of wading safety apparatus 500 may further control vehicle 10 to wade through waterbody 30 via the wading route according to the wading speed or speed profile.

In some embodiment, wading safety apparatus 500 may include a user interface 540 capable of conduction communication with a user such as a driver of vehicle 10. User interface 540 may communicate with the user via visual display, sound, voice, speech synthesis/recognition, touch, haptic or other human-sensible means. In some embodiments, wading safety apparatus 500 may be capable of presenting through user interface 540 a probability of failure for each of the critical components if vehicle 10 is to wade through waterbody 30, so that the driver of vehicle 10 may make a comprehensive decision, based on the probabilities of failure of the critical component presented through user interface 540, whether or not to wade through waterbody 30.

Figure 6:
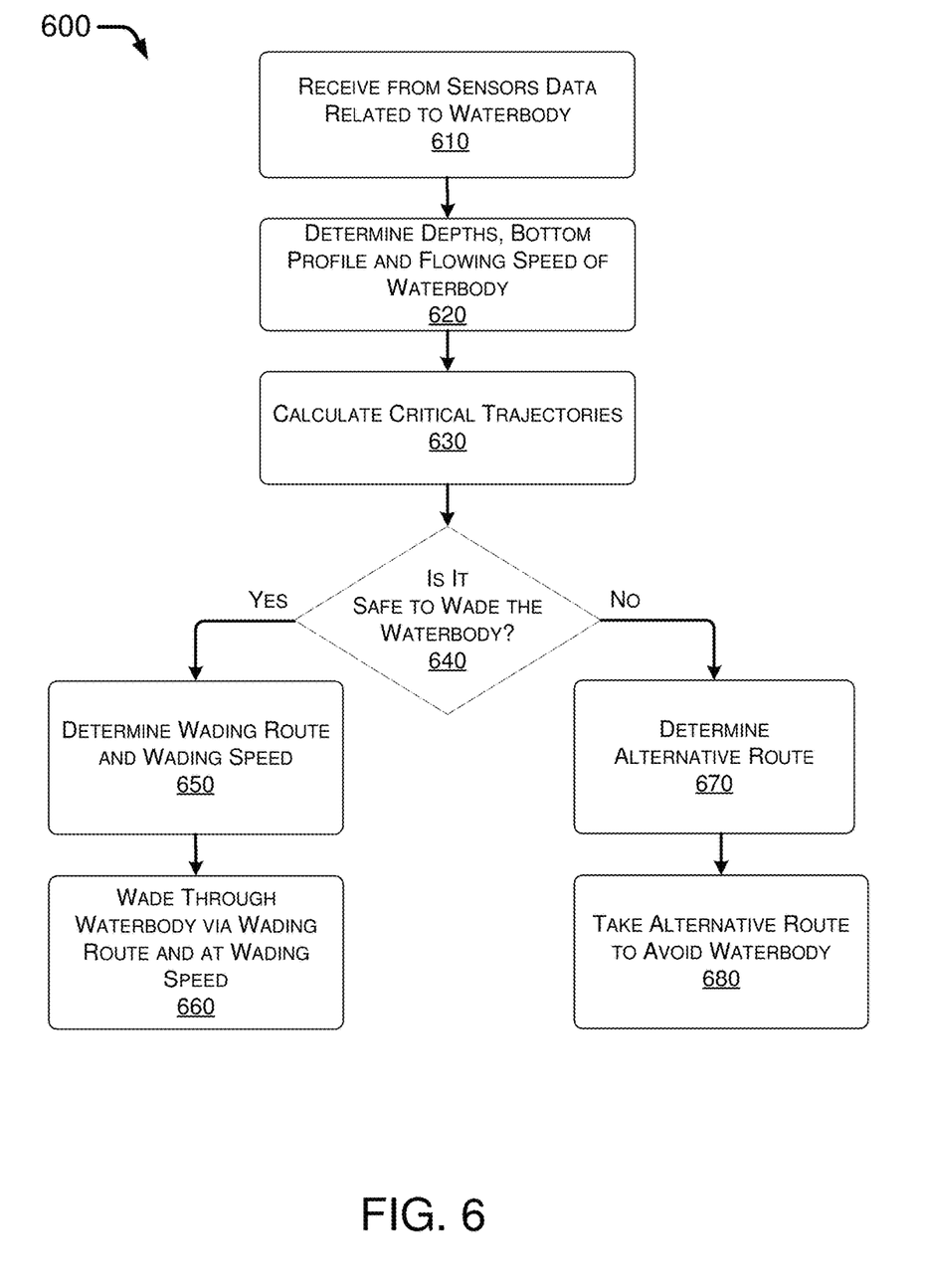
FIG. 6 is a flowchart depicting an example process in accordance with an embodiment of the present disclosure.

FIG. 6 illustrates an example process 600, in accordance with the present disclosure, for determining whether or not a vehicle should wade through a waterbody. Process 600 may include one or more operations, actions, or functions shown as blocks such as 610, 620, 630, 640, 650, 660, 670 and 680. Although illustrated as discrete blocks, various blocks of process 600 may be divided into additional blocks, combined into fewer blocks, or eliminated, depending on the desired implementation. Process 600 may be implemented by wading safety apparatus 500 of FIG. 5. In addition, process 600 may use the first, second and third proposed schemes of determining one or more aspects of waterbody 30 as illustrated previously in FIGS. 1-4. Process 600 may begin with block 610.

At 610, process 600 may involve processor 510 receiving data related to a waterbody (such as waterbody 30) from one or more sensors (such as above-water sensor 50 and underwater sensor 60). The data related to the waterbody may include data representing one or more edges of the waterbody (such as edges 31 and 32 of waterbody 30), a first and second reflected signals from the waterbody (such as the first and second reflected signals in the second and third proposed scheme disclosed above), a motion picture of a floating object in the waterbody (such as tree branch 38 and wooden box 39 of scenario 120 of FIG. 1), or a combination thereof. Process 600 may proceed from 610 to 620.

At 620, process 600 may involve processor 510 determining one or more aspects of the waterbody based on the data received from the one or more sensors. The one or more aspects of the waterbody may include water depths at various locations of the waterbody (such as maximum water depth D of FIGS. 2 and 3), as well as a bottom profile of the waterbody (such as bottom profile 35 of FIGS. 2-4). In some embodiments, at 620, process 600 may involve processor 510 determining a flowing speed of the waterbody. Process 600 may proceed from 620 to 630.

At 630, process 600 may involve processor 510 calculating one or more critical trajectories (such as critical trajectory 44 of FIGS. 2 and 3) of one or more critical components (such as critical component 40) of the vehicle that are susceptible to water damage. The calculation of the critical trajectories is based at least in part on the bottom profile of the waterbody (such as bottom profile 35) and a spatial model of the vehicle. The spatial model defines a spatial relationship of each of the critical components relative to a fixed reference point of the vehicle (such as reference point 14 of FIG. 3). Process 600 may proceed from 630 to 640.

At 640, process 600 may involve processor 510 determining whether it is safe for the vehicle to wade the waterbody based on the one or more critical trajectories and a top surface of the waterbody (such as top surface 33 of waterbody 30 as shown in FIGS. 2-4). In some embodiments, process 600 may involve processor 510 determining that it is safe for the vehicle to wade the waterbody in an event that each of the critical trajectories is above the top surface of the waterbody. On the other hand, processor 510 determines that it is unsafe for the vehicle to wade the waterbody in an event that at least a portion of one of the critical trajectories is below the top surface of the waterbody. In some embodiment, process 600 may involve processor 510 determining whether it is safe or not based on the speed of the current and a buoyancy model of the vehicle. The buoyancy model, as described earlier, models the behavior of the vehicle when subject to a flowing water. In an event that processor 510 determines that it is safe for the vehicle to wade the waterbody, process 600 may proceed from 640 to 650. Alternatively, in an event that processor 510 determines that it is unsafe for the vehicle to wade the waterbody, process 600 may proceed from 640 to 670.

At 650, process 600 may involve processor 510 determining a wading route via which the vehicle is able to wade through the waterbody safely. In some embodiments, at 650, process 600 may further involve processor 510 determining a wading speed at which the vehicle is able to wade through the waterbody safely via the wading route. Process 600 may proceed from 650 to 660.

At 660, process 600 may involve processor 510 controlling the vehicle to autonomously wade through the waterbody via the wading route. In some embodiments, at 660, process 600 may further involve processor 510 controlling the vehicle to autonomously wade through the waterbody safely via the wading route at the wading speed.

At 670, process 600 may involve processor 510 determining an alternative route via which the vehicle is able to avoid the waterbody. Process 600 may proceed from 670 to 680.

At 680, process 600 may involve processor 510 controlling the vehicle to autonomously drive the alternative route and avoid the waterbody.

In the case that the vehicle approaching the waterbody is an autonomous vehicle, the present disclosure provides a viable solution to ensure a wading safety thereof. In the absence of the present disclosure, the autonomous vehicle may either proceed blindly, which may endanger the occupants of the vehicle and also the vehicle itself, or refuse to proceed at all, which may cause unnecessary re-routes.

In the case that there are other vehicles that are wading through the waterbody, the above-water sensors may be employed to observe those other vehicles and collect information thereof to help determine the one or more aspects of the waterbody.

Although the disclosure presented above is described in the context of a flooding situation where a temporary waterbody is created or formed due to a flood, techniques, methods, schemes and apparatuses described herein may also be applied in a context where a waterbody is not temporary. For example, a vehicle, such as a ruggedized exploring jeep, may go off-road and wade a permanent waterbody such as a river or a pond. Methods and apparatuses disclosed in the present disclosure are equally applicable in that context.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
   determining, by a processor, one or more aspects of a waterbody;
   calculating, by the processor, one or more critical trajectories of a vehicle wading the waterbody based at least in part on the one or more aspects;
   determining, by the processor, whether it is safe for the vehicle to wade the waterbody based on the one or more critical trajectories and the one or more aspects; and
   estimating, by the processor, a speed of a current of the waterbody based on input from one or more above-water sensors disposed on the vehicle, the one or more above-water sensors configured to track a floating object carried by the current,
   wherein the determining of whether it is safe for the vehicle to wade the waterbody is further based on the speed of the current and a buoyancy model of the vehicle.

2. The method of claim 1, wherein the determining of the one or more aspects of the waterbody comprises:
   receiving, from one or more above-water sensors disposed on the vehicle, data representing one or more edges of the waterbody; and
   determining one or more depths and a bottom profile of the waterbody based on the edges and a topographic information of a location related to the waterbody.

3. The method of claim 2, wherein the one or more above-water sensors comprise a visible-light camera, an infrared camera, a stereo camera, a time-of-flight (TOF) camera, a light-detection-and-ranging (LIDAR) transceiver, a radio-detection-and-ranging (RADAR) transceiver, an ultrasound transceiver, or a combination thereof.

4. The method of claim 1, wherein the determining of the one or more aspects of the waterbody comprises:
   receiving, from one or more above-water sensors disposed on the vehicle, a first reflected signal and a second reflected signal, the first reflected signal being a first portion of a sensing signal reflected by a top surface of the waterbody, the second reflected signal being a second portion of the sensing signal reflected by a ground surface underneath the waterbody; and
   calculating, by the processor, one or more depths and a bottom profile of the waterbody based at least in part on the first reflected signal and the second reflected signal.

5. The method of claim 4, wherein the one or more above-water sensors comprise a time-of-flight (TOF) camera, a light-detection-and-ranging (LIDAR) transceiver, a radio-detection-and-ranging (RADAR) transceiver, an ultrasound transceiver, or a combination thereof.

6. The method of claim 4, further comprising:
   analyzing the first reflected signal and the second reflected signal using one or more statistical filters before the calculating of the one or more depths and the bottom profile of the waterbody.

7. The method of claim 1, wherein the determining of the one or more aspects of the waterbody comprises:
   utilizing one or more under-water sensors in the waterbody;
   controlling the one or more under-water sensors to transmit a sensing signal toward a top surface of the waterbody and a ground surface underneath the waterbody;
   controlling the one or more under-water sensors to receive a first reflected signal and a second reflected signal, the first reflected signal being a first portion of the sensing signal reflected by the top surface of the waterbody, the second reflected signal being a second portion of the sensing signal reflected by the ground surface underneath the waterbody; and
   calculating one or more depths and a bottom profile of the waterbody based at least in part on the first reflected signal and the second reflected signal.

8. The method of claim 1, wherein:
   the one or more aspects of the waterbody comprise a bottom profile of the waterbody,
   the calculating of the one or more critical trajectories is based on the bottom profile and a spatial model of the vehicle,
   the spatial model of the vehicle comprises a spatial relationship of each of one or more critical components of the vehicle relative to a fixed reference point of the vehicle, each of the one or more critical components susceptible to water damage, and
   each of the one or more critical trajectories comprises a moving trajectory of a corresponding one of the one or more critical components as the vehicle traverses the bottom profile of the waterbody.

9. The method of claim 1, wherein the one or more aspects of the waterbody comprise one or more depths of the waterbody that collectively define a top surface of the waterbody, and wherein the determining of whether it is safe for the vehicle to wade the waterbody comprises:
   determining it is safe for the vehicle to wade the waterbody in an event that each of the critical trajectories is above the top surface of the waterbody; and
   determining it is unsafe for the vehicle to wade the waterbody in an event that at least a portion of one of the critical trajectories is below the top surface of the waterbody.

10. The method of claim 9, further comprising:
    determining, by the processor, a wading route via which the vehicle is able to wade through the waterbody safely in response to the determining that it is safe for the vehicle to wade the waterbody; and
    determining, by the processor, an alternative route via which the vehicle is able to avoid the waterbody in response to the determining that it is unsafe for the vehicle to wade the waterbody.

11. The method of claim 10, further comprising:
    controlling, by the processor, the vehicle to autonomously wade the waterbody via the wading route.

12. The method of claim 1, further comprising:
    utilizing, by the processor, one or more under-water sensors in the waterbody to measure the speed of the current of the waterbody,
    wherein the determining of whether it is safe for the vehicle to wade the waterbody is further based on the speed of the current and the buoyancy model of the vehicle.

13. An apparatus, comprising:
    a memory capable of storing one or more sets of instructions and a spatial model of a vehicle; and a processor coupled to execute the one or more sets of instructions stored in the memory such that, upon executing the one or more sets of instructions, the processor performs operations comprising:

determining one or more depths and a bottom profile of a waterbody, via a sensor;

calculating one or more critical trajectories of the vehicle based on the bottom profile of the waterbody and the spatial model of the vehicle;

determining whether it is safe for the vehicle to wade the waterbody based on the one or more depths of the waterbody and the one or more critical trajectories; and performing, via a navigation device either:

determining a wading route via which the vehicle is able to wade through the waterbody safely and a wading speed at which the vehicle is able to wade through the waterbody safely via the wading route; or determining an alternative route via which the vehicle is able to avoid the waterbody.

14. The apparatus of claim 13, further comprising:

one or more above-water sensors disposed on the vehicle, the one or more above-water sensors capable of sensing one or more edges of the waterbody, wherein the memory is also capable of storing a topographic information of a location related to the waterbody, and wherein the processor determines the one or more depths and the bottom profile of the waterbody based on the edges and the topographic information.

15. The apparatus of claim 13, further comprising:

one or more above-water sensors disposed on the vehicle to transmit a sensing signal toward the waterbody and receive a first reflected signal and a second reflected signal from the waterbody, wherein the first reflected signal comprises a first portion of the sensing signal reflected by a top surface of the waterbody, wherein the second reflected signal comprises a second portion of the sensing signal reflected by a ground surface underneath the waterbody, and wherein the processor determines the one or more depths and the bottom profile of the waterbody based at least in part on the first reflected signal and the second reflected signal.

16. The apparatus of claim 13, further comprising:

one or more above-water sensors disposed on the vehicle to estimate a flowing speed of the waterbody by tracking a floating object carried by the waterbody, wherein the memory is also capable of storing a buoyancy model of the vehicle, and wherein the determining of whether it is safe for the vehicle to wade the waterbody is further based on the flowing speed of the waterbody and the buoyancy model of the vehicle.

17. The apparatus of claim 13, further comprising:

one or more under-water sensors disposed on the vehicle to measure a flowing speed of the waterbody when submerged within the waterbody, wherein the memory is also capable of storing a buoyancy model of the vehicle, and wherein the determining of whether it is safe for the vehicle to wade the waterbody is further based on the flowing speed of the waterbody and the buoyancy model of the vehicle.

\* \* \* \* \*